(12) United States Patent
Pabon et al.

(10) Patent No.: US 9,794,366 B1
(45) Date of Patent: Oct. 17, 2017

(54) PERSISTENT-MEMORY MANAGEMENT

(71) Applicant: Red Hat, Inc., Raleigh, NC (US)

(72) Inventors: Luis Pablo Pabon, Sturbridge, MA (US); Jeffrey Alan Brown, Shrewsbury, MA (US); Henry Dan Lambright, Nashua, NH (US)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 15/298,119

(22) Filed: Oct. 19, 2016

(51) Int. Cl.
*G06F 15/16* (2006.01)
*H04L 29/08* (2006.01)

(52) U.S. Cl.
CPC ...... *H04L 67/2842* (2013.01); *H04L 67/1097* (2013.01)

(58) Field of Classification Search
CPC ...................... H04L 67/1097; H04L 67/2842
USPC ........................................................ 709/214
See application file for complete search history.

(56) References Cited

U.S. PATENT DOCUMENTS

| | | | | |
|---|---|---|---|---|
| 5,408,629 A * | 4/1995 | Tsuchiya | .................... | G06F 9/52 711/148 |
| 6,446,175 B1 * | 9/2002 | West | .................... | G06F 11/1456 711/161 |
| 6,889,294 B1 * | 5/2005 | Nichols | ................. | G06F 3/0611 707/999.01 |
| 6,912,629 B1 * | 6/2005 | West | .................... | G06F 11/1456 711/161 |
| 6,941,396 B1 * | 9/2005 | Thorpe | ................. | G06F 3/0613 707/999.202 |
| 7,383,290 B2 | 6/2008 | Mehra et al. | | |
| 7,536,444 B2 * | 5/2009 | Kawamura | ......... | G06F 11/2064 709/212 |
| 7,536,495 B2 * | 5/2009 | Ashmore | ............ | G06F 11/2089 710/310 |
| 7,627,693 B2 * | 12/2009 | Pandya | ................... | H04L 29/06 709/212 |
| 8,122,192 B2 * | 2/2012 | Tanigawa | .............. | G06F 12/084 711/117 |
| 8,577,986 B2 | 11/2013 | Pinkerton et al. | | |

(Continued)

FOREIGN PATENT DOCUMENTS

WO    WO 2015094176 A1    6/2015

OTHER PUBLICATIONS

Dulloor, S. R., "Systems and Applications for Persistent Memory", A Thesis Presented to the Academic Faculty, Georgia Institute of Technology, Dec. 2015, https://smartech.gatech.edu/bitstream/handle/1853/54396/DJULLOR-DISSERTATION-2015.pdf.

(Continued)

*Primary Examiner* — Imad Hussain
(74) *Attorney, Agent, or Firm* — Kilpatrick Townsend & Stockton LLP (57) ABSTRACT

Data can be stored in a persistent-memory device, rather than a hard drive, of a computing device. A copy of the data can also be stored in another persistent-memory device of a remote computing device. For example, a central processing unit (of the computing device) can perform a first write operation to cause a file to be stored in the persistent-memory device. A memory controller can perform a second write operation to cause another memory controller of the remote computing device to store a copy of the file in the other persistent-memory device of the remote computing device.

20 Claims, 4 Drawing Sheets

(56) References Cited

U.S. PATENT DOCUMENTS

| | | | | |
|---|---|---|---|---|
| 8,874,680 | B1* | 10/2014 | Das | H04L 67/1095 709/212 |
| 9,342,417 | B2 | 5/2016 | Usgaonkar et al. | |
| 9,354,992 | B2* | 5/2016 | Ramasubramaniam | |
| 2003/0005355 | A1* | 1/2003 | Yanai | G06F 3/0601 714/5.11 |
| 2003/0105931 | A1* | 6/2003 | Weber | G06F 11/2076 711/162 |
| 2005/0132250 | A1* | 6/2005 | Hansen | G06F 11/2097 714/5.11 |
| 2005/0216552 | A1* | 9/2005 | Fineberg | G06F 12/0284 709/203 |
| 2006/0161707 | A1* | 7/2006 | Davies | G06F 11/2089 710/268 |
| 2007/0078940 | A1* | 4/2007 | Fineberg | G06F 13/28 709/216 |
| 2008/0133695 | A1* | 6/2008 | Suzuki | G06F 11/2074 709/216 |
| 2008/0177803 | A1* | 7/2008 | Fineberg | G06F 17/30368 |
| 2008/0201616 | A1* | 8/2008 | Ashmore | G06F 11/0727 714/57 |
| 2009/0089537 | A1* | 4/2009 | Vick | G06F 12/1072 711/203 |
| 2010/0211737 | A1* | 8/2010 | Flynn | G06F 3/0616 711/114 |
| 2012/0239860 | A1* | 9/2012 | Atkisson | G06F 12/0246 711/103 |
| 2013/0007180 | A1* | 1/2013 | Talpey | H04L 47/39 709/212 |
| 2013/0110959 | A1* | 5/2013 | Sharp | G06F 9/5016 709/212 |
| 2014/0040411 | A1* | 2/2014 | Weber | G06F 3/0607 709/212 |
| 2015/0032835 | A1* | 1/2015 | Sharp | G06F 15/167 709/212 |
| 2015/0039712 | A1 | 2/2015 | Frank et al. | |
| 2015/0186205 | A1* | 7/2015 | Boggs | G06F 13/24 714/6.22 |
| 2015/0281361 | A1* | 10/2015 | Maeda | G06F 17/30067 709/219 |
| 2015/0293881 | A1* | 10/2015 | Raikin | G06F 12/1072 709/212 |
| 2015/0326684 | A1* | 11/2015 | Takefman | G06F 9/54 709/212 |
| 2016/0117129 | A1 | 4/2016 | Shrader et al. | |
| 2016/0179375 | A1 | 6/2016 | Kirvan et al. | |
| 2016/0267050 | A1* | 9/2016 | Supnik | G06F 15/167 |
| 2016/0285997 | A1* | 9/2016 | Wu | G06F 17/30902 |
| 2016/0294983 | A1* | 10/2016 | Kliteynik | G06F 12/0802 |
| 2017/0034268 | A1* | 2/2017 | Govind | H04L 67/1097 |
| 2017/0039145 | A1* | 2/2017 | Wu | G06F 17/30902 |

OTHER PUBLICATIONS

Deierling, K., "Persistent Memory over Fabrics Let it out of the Box!", Open Server Summit, Santa Clara, CA, Apr. 2016, https://www.openserversummit.com/English/Collaterals/Proceedings/2016/20160413_Keynote5_Deierling.pdf.

Malladi, K.T. et al., "DRAMPersist: Making DRAM Systems Persistent", MEMSYS '16 Oct. 3-6, 2016, Washington, D.C., https://www.cs.utah.edu/~manua/pubs/memsys16b.pdf.

Zhang,Y. et al., "Mojim: A Reliable and Highly-Available Non-Volatile Memory System", Department of Computer Science and Engineering, University of California, San Diego, 2015, https://cseweb.ucsd.edu/~swanson/papers/ASPLOS2015Mojim.pdf.

* cited by examiner

PERSISTENT-MEMORY MANAGEMENT

TECHNICAL FIELD

The present disclosure relates generally to storage access and control. More specifically, but not by way of limitation, this disclosure relates to managing persistent-memory devices.

BACKGROUND

A computing device can have various types of memory devices. Examples of the memory devices can include registers and caches within a central processing unit of the computing device. The registers and caches can have relatively low latency due to the position of the registers and caches within the central processing unit. But the registers and caches can have a relatively small amount of storage space. And registers and caches can be volatile (i.e., the registers and caches can lose their data when powered off).

Another example of a type of memory device includes random access memory (RAM) that is physically positioned outside of, but close to, the central processing unit. RAM can have a larger amount of storage space than registers and caches, but RAM can also have higher latency than the registers and caches due to the distance between the RAM and the central processing unit. RAM can also be volatile.

Another example of a type of memory device includes a hard drive that is physically positioned farther from the central processing unit than the RAM. The hard drive can have a larger amount of storage space than RAM, but the hard drive can also have higher latency than the RAM due to the distance between the hard drive and the CPU. The hard drive may be particularly useful for storing large amounts of data for long periods of time, because the hard drive can be non-volatile (i.e., the hard drive can retain data even when powered off), unlike the registers, caches, and RAM.

DETAILED DESCRIPTION

There can be disadvantages to using hard drives to store data in certain situations. For example, hard drives can have a high amount of latency as compared to other types of memory devices, such as registers, caches, and random access memory (RAM). Further, hard drives can fail or become damaged more easily than other types of memory devices. And if a hard drives fails or becomes damaged, the data stored on the hard drive can be corrupted or irretrievably lost.

Some examples of the present disclosure overcome one or more of the abovementioned issues by (i) storing data in a persistent-memory device, rather than a hard drive, of a computing device and (ii) storing a copy of the data in another persistent-memory device of another, remotely located computing device. In some examples, by storing the data in the persistent-memory device, the latency and performance issues associated with hard drives can be reduced or eliminated. And by storing a copy of the data in the other persistent-memory device of the remotely located computing device, a backup of the data is available should one of the computing devices fail.

Persistent-memory devices can be loosely categorized as falling between RAM and hard drives on a spectrum of storage capacity and performance. For example, persistent-memory devices can have more storage space than RAM. But persistent-memory devices can also have higher latency than RAM and worse performance (e.g., can access data more slowly) than RAM (but as technology progresses, persistent-memory devices are more readily approaching the low latency and faster performance of RAM). Conversely, persistent-memory devices can have less storage space than hard drives. But persistent-memory devices can have lower latency (e.g., by orders of magnitude) and better performance than hard drives. The lower latency and better performance can make persistent-memory devices more suitable than hard drives for storing data.

Some examples of the present disclosure can be implemented as a highly available system. A highly available system can include multiple computing devices that (i) share data to provide redundancy or quick access to the data, (ii) detect failures (e.g., a computing device shutting down or having an error), (iii) correct the failures, or any combination of these. In one example, the highly available system can include a first computing device that stores data in a local persistent-memory device and a copy of the data in another persistent-memory device of a second computing device. If the second computing device needs the data (e.g., to perform one or more operations), the second computing device has quick and immediate access to the copy of the data, without having to request the data from the first computing device. Also, if the first computing device has an error or otherwise fails, the second computing device can still access the copy of the data. And, after the error or failure is corrected, the first computing device can obtain the data from the second computing device and use the data as needed (e.g., to restore the first computing device to a previous state).

In some examples, the first computing device can synchronously store the data in the local persistent-memory device and the copy of the data in the other persistent-memory device. For example, the first computing device can use a central processing unit to perform a first write operation to store the data in the local persistent-memory device. The first computing device can substantially simultaneously (e.g., at the same time or within a short duration of time, such within two microseconds of one another) use a memory controller to perform a second write operation that causes the copy of the data to be stored in the other persistent-memory device. The memory controller can have remote direct memory access (RDMA) capabilities for causing the copy of the data to be stored in the other persistent-memory device. Performing the first write operation and the second write operation substantially simultaneously can enable an operating system or application executing on the central processing unit, which may be waiting for the write operations to be completed, to experience a low amount of latency. In some examples, performing the second write operation using RDMA, which can have lower latency than other types of memory protocols, can also reduce the amount of latency experienced by the operating system or application.

Some or examples of the present disclosure can be implemented at least in part by a storage stack of a computing device (e.g., a Linux-based computing device). A stack can be a software-based component or buffer used for storing requests that are to be handled. A storage stack can be a stack for storing data-storage requests and data-retrieval requests. In some examples, the storage stack of the first computing device, the second computing device, or both can be modified to implement some or all of the examples described herein. For example, the storage stack of the first computing device can be modified to cause the first computing device to automatically perform the second write operation each time the first computing device performs the first write operation.

In some examples, the first write operation, the second write operation, or both of these can be substantially "hidden" from (e.g., performed substantially independently of) the central processing unit, an operating system executing on the central processing unit, an application (e.g., a higher-level application) running within the operating system, or any combination of these. Performing memory operations in a manner that is hidden from or substantially independent of the central processing unit, the operating system, or an application running within the operating system can be referred to as transparency.

In some examples, some or all of the abovementioned features can be combined to form a storage system that is persistent memory-based, highly available, synchronous, and transparent.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

Figure 1:
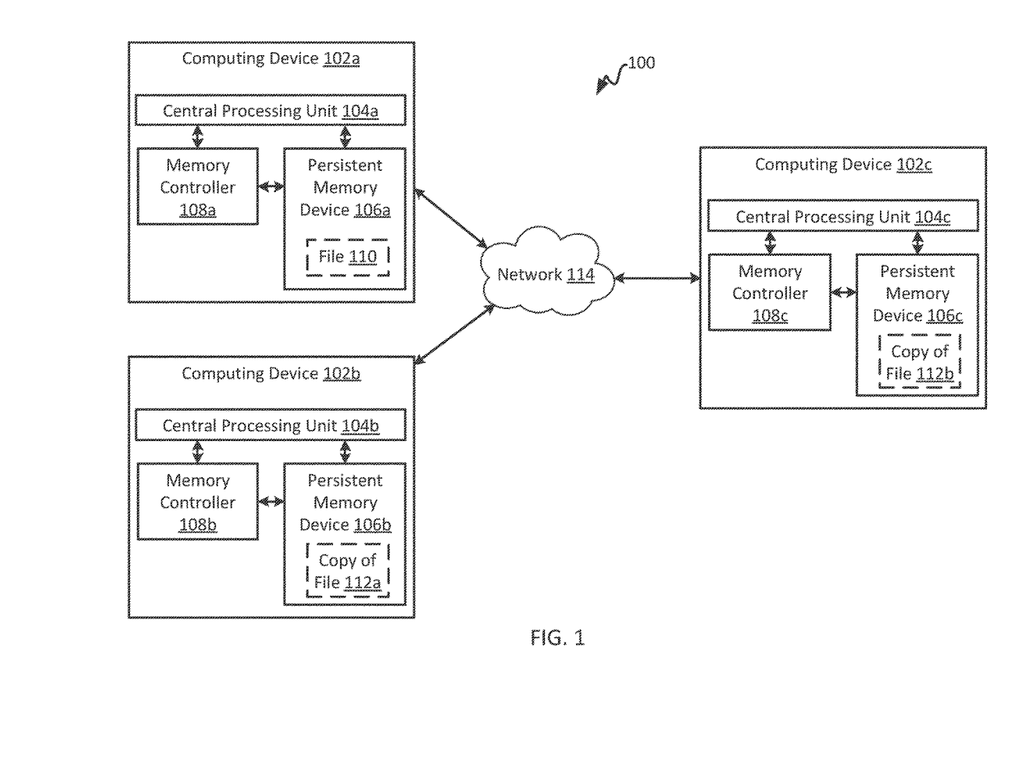
FIG. 1 is a block diagram of an example of a system for managing persistent-memory devices according to some aspects.

FIG. 1 is a block diagram of an example of a system 100 for managing persistent-memory devices 106a-c according to some aspects. The persistent-memory devices 106a-c can be included in respective computing devices 102a-c that form the system 100.

The computing devices 102a-c can be in communication with one another via a network 114, such a local access network (LAN). The network 114 can include one or more subnetworks, a wide area network (WAN), the Internet, or any combination of these. The computing devices 102a-c can and communicate with one another via one or more wired or wireless network-interface components, such as a serial interface, an IEEE 802.11 interface, an infiniband interface, or any combination of these.

Each of the computing devices 102a-c can include a central processing unit, such as central processing unit 104a, and a persistent-memory device, such as persistent-memory device 106a. Each persistent-memory device can be communicatively coupled to a respective central processing unit. The persistent-memory device is non-volatile. The persistent-memory device can be byte-addressable or block-addressable. A byte-addressable memory device can be a memory device in which each memory address refers to a single block of eight bits, which can be referred to as a byte. A block-addressable memory device can be a memory device in which data is read and written in a fixed chunk-size (e.g., a chunk-size of 4096 bytes).

The central processing unit can perform operations (e.g., memory operations). Examples of the operations can include a write operation for writing data to a memory device, such as persistent-memory device 106a or another memory device; a read operation for reading data from a memory device; or both of these.

Each of the computing devices 102a-c can include a memory controller, such as memory controller 108a, communicatively coupled to a respective persistent-memory device, such as persistent-memory device 106a. The memory controller can perform operations for controlling the persistent-memory device. Examples of the operations can include a read operation for reading data from the persistent-memory device, another read operation for reading data from a remote persistent-memory device, a write operation for storing data on the persistent-memory device, another write operation for storing data on the remote persistent-memory device, or any combination of these.

The memory controllers 108a-c can have RDMA capabilities (e.g., can implement an RDMA protocol, such as RFC 5040) for exchanging data between the persistent-memory devices 106a-c of the computing devices 102a-c. The RDMA capabilities can enable the computing devices 102a-c to read data and store data in each other's persistent-memory devices 106a-c, without involving the central processing units 104a-c, operating systems or applications executing on the central processing units 104a-c, or any combination of these. To implement RDMA, the memory controllers 108a-c can each include a transport layer that employs a transport protocol. The transport protocol can enable the memory controllers 108a-c to communicate with one another, via the network 114, independently of the central processing units 104a-c. In other examples, the memory controllers 108a-c can implement additional or alternative protocols (e.g., an internet protocol) for communicating with one another directly (e.g., independently of the central processing units 104a-c).

As a particular example, the central processing unit 104a of computing device 102a can execute a first write operation to store data in persistent-memory device 106a, which can be a local persistent-memory device with respect to the computing device 102a. The data can be a file 110, a command, an instruction, or any combination of these. The memory controller 108a can additionally or alternatively execute a second write operation to store a copy of the data (e.g., the copy of the file 112a) in persistent-memory device 106b of computing device 102b. For example, the memory controller 108a can perform a RDMA write operation to store the copy of the data in the persistent-memory device 106b. The memory controller 108a can additionally or alternatively execute a third write operation to store another copy of the data (e.g., the copy of the file 112b) in persistent-memory device 106c of computing device 102c. The memory controller 108a can perform the second write operation and the third write operation synchronously or sequentially (e.g., one write operation can immediately follow the other). The computing device 102a can cause any number of copies of the data to be stored in any number and combination of remote computing devices 102b-c.

In some examples, the computing devices 102a-c can implement an erasure coding (e.g., via an erasure coding protocol, such as RAID-5 or RAID-6) to distribute, store, and/or recover data. Erasure coding can include dividing data into fragments. The fragments can be encoded, expanded (e.g., to include redundant segments of the data), or both of these. The modified fragments (expanded and/or encoded fragments) can then be stored among multiple memory devices, such as memory devices on local computing devices, remote computing devices, or any combination of these. As a particular example, the computing device 102a can cause data to be fragmented, encoded, and distributed among the other computing devices 102b-c according to an erasure-coding scheme. Erasure coding can result in the total amount of data that is saved across on the computing devices 102b-c being smaller than using other methods, thereby saving computing resources.

In some examples, the computing devices 102a-c can allocate portions of their respective persistent-memory devices 106a-c for storing local data and remote data. For example, the memory controller 108a can allocate a first segment of the persistent-memory device 106a for storing local data, a second segment of the persistent-memory device 106a for storing data from computing device 102b, and a third segment of the persistent-memory device 106a for storing data from computing device 102c. The first segment, second segment, and third segment of the persistent-memory device 106a can be the same size or different sizes. The computing devices 102a-c can allocate any number and combination of segments, of any sizes, for storing local data, remote data, or both. The number, combination, and sizes of the segments can be customized or configured by a user and may be fixed or variable.

In some examples, the memory controller 108a can receive a request to store data from the memory controller 108c. The memory controller 108a can determine which segment of the persistent-memory device 106a is associated with the memory controller 108c. For example, the memory controller 108a can determine which segment is associated with the computing device 102c that includes the memory controller 108c by consulting a lookup table or database that correlates the computing devices 102b-c with segments of the persistent-memory device 106a. The computing device 102a can then store the data in the segment of the persistent-memory device 106a that is associated with the memory controller 108c.

Although the memory controllers 108a-c are shown in FIG. 1 as independent components within their respective computing devices 102a-c, in other examples, the memory controllers 108a-c can be (or can be included in) network-interface components or other hardware of the computing devices 102a-c. One example of a network-interface component is a network interface controller (NIC). The memory controller 108a can be included in the network interface controller. The network interface controller may be able to separately establish both (i) communications between the central processing units 104a-b of computing devices 102a-b, and (ii) communications between the memory controllers 108a-b of the computing device 102a-b. This can enable the memory controllers 108a-b to transmit commands to one another and receive commands from one another, independent of the central processing units 104a-b.

In some examples, the computing devices 102a-c may execute an application for controlling the persistent-memory device 106a. For example, the central processing unit 104 can execute the application. The application can be independent of an operating system and a higher-level application executing within the environment of the operating system. In such an example, the operating system and the higher-level application may not be aware of the memory operations being performed, providing a level of transparency.

The system 100 can be a highly available system. For example, the computing devices 102a-c can poll one another or otherwise communicate with one another to determine if a computing device 102a or an application running on a computing device 102a has failed. If so, the remaining computing devices 102b-c can reroute data or traffic; run a correction process to restart the computing device 102a, the application, or otherwise correct the failure; or any combination of these. This can ensure that the computing devices and applications executing thereon are highly available to users. As another example, the computing devices 102b-c may rely on the file data in the file 110 to perform operations. By storing the copies of the file 112a-b on the computing devices 102b-c, the computing devices 102b-c can quickly and easily access the file data, without having to request the file 110 from the computing device 102a and wait for the computing device 102a to provide the file 110. This can ensure that the file data is highly available for use by the computing devices 102b-c.

The system 100 shown in FIG. 1 is for illustrative purposes. Other systems can include any number and combination of computing devices having any number and combination of the features discussed above. Also, the examples described above are for illustrative purposes. Any number and combination of the central processing units 104a-c and memory controllers 108a-c can perform any number and combination of the write operations and other functions discussed above. Further, some examples of the present disclosure can be implemented using other types of memory devices, such as battery-backed dynamic random access memory (DRAM), an example of which may be non-volatile dual in-line memory module (NVDIMM)); magnetoresistive random-access memory (MRAM); or other persistent memory technologies.

Figure 2:
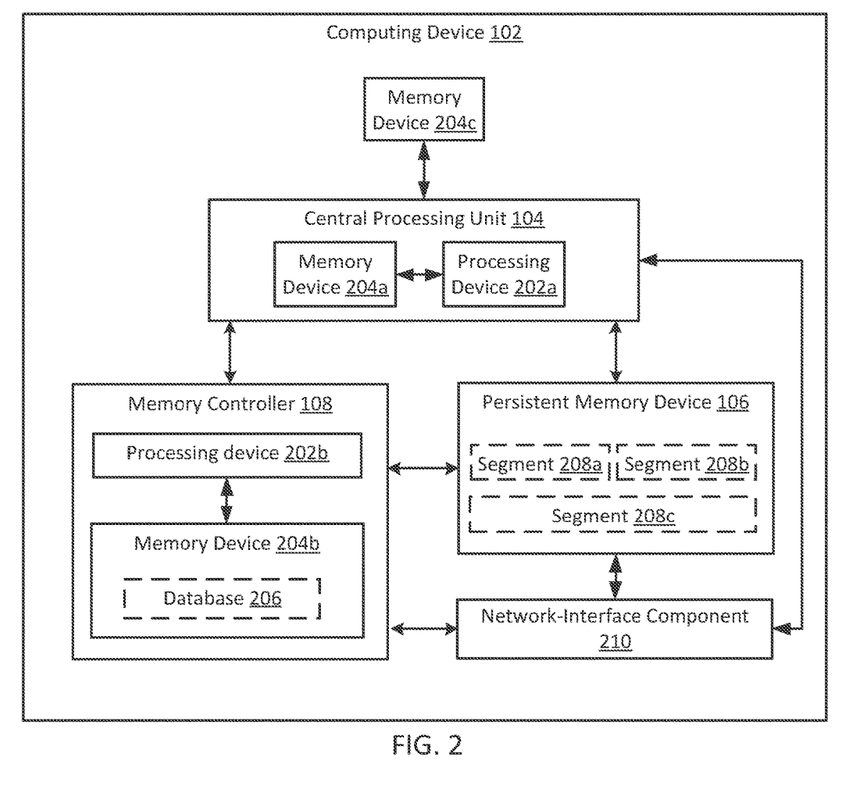
FIG. 2 is a block diagram of an example of a computing device according to some aspects.

FIG. 2 is a block diagram of an example of a computing device 102 according to some aspects. The computing device 102 can include a central processing unit 104, a persistent-memory device 106, a memory controller 108, or any combination of these. In some examples, some or all of the components shown in FIG. 2 can be integrated into a single structure, such as a single housing. In other examples, some or all of the components shown in FIG. 2 can be distributed (e.g., in separate housings) and in electrical communication with each other.

The central processing unit 104 can include one or more processing devices 202a. Non-limiting examples of a processing device 202a can include a Field-Programmable Gate Array (FPGA), an application-specific integrated circuit (ASIC), a microprocessor, etc.

The central processing unit 104 can include a memory device, such as memory device 204a, or can be communicatively coupled to a memory device, such as memory device 204c, via a bus. The processing device 202a can execute instructions stored in the memory device to perform operations. The memory device can be volatile or non-volatile. Non-limiting examples of the memory device can include electrically erasable and programmable read-only memory (EEPROM), flash memory, a persistent-memory device, or any other type of non-volatile memory. In some examples, at least some of the memory device can include a medium (e.g., a computer-readable medium) from which the central processing unit can read instructions. The medium can include electronic, optical, magnetic, or other storage devices capable of providing the processing device 202a with computer-readable instructions or other program code. Non-limiting examples of the medium include (but are not limited to) magnetic disk(s), memory chip(s), read-only memory (ROM), random-access memory (RAM), an ASIC, a configured processor, optical storage, or any other medium from which the processing device 202a can read instructions. The instructions can include processor-specific instructions generated by a compiler or an interpreter from code written in any suitable computer-programming language, including, for example, C, C++, etc.

The memory controller 108 can include hardware components, software components, or both of these. For example, the memory controller 108 can include a processing device 202b. The processing device 202b can have any of the features discussed above with respect to processing device 202a. The memory controller 108 can additionally or alternatively include a memory device 204b. The memory device 204b can be communicatively coupled to a processing device (e.g., processing device 202b or processing device 202a) via a bus. The memory device 204b can have any of the features discussed above with respect to the memory devices 204a, 204c. The memory device 204b can include instructions that are executable by the processing device (e.g., processing device 202b or the processing device 202a) for causing the processing device to perform operations. The memory controller 108 can additionally or alternatively include other circuitry, such as a resistor, integrated circuit, capacitor, multiplexer, demultiplexer, analog-to-digital converter, digital-to-analog converter, inductor, or any combination of these. Although the memory controller 108 is depicted as being separate from the central processing unit 104, in other examples the memory controller 108 can be integrated with the central processing unit 104. For example, the memory controller 108 can include a program-code module stored in the memory device 204a of the central processing unit 104.

In some examples, the computing device 102 can include a database 206. In some examples, the database 206 can include information that maps computing devices to particular segments of the persistent-memory device 106. Although the database 206 is depicted as being within memory device 204b, in other examples the database 206 can be included in memory device 204a or memory device 204c.

In some examples, the persistent-memory device 106 can include multiple segments, such as segments 208a-c, of the same size or different sizes. The computing device 102 can store data (e.g., as discussed above with respect to FIG. 1) from remote computing devices in the segments.

In some examples, the segments of a persistent memory device can have one or more associated settings. Examples of the settings can include a compression setting (e.g., indicating if data is to be compressed before it is stored in the segment); an encryption setting or encoding setting (e.g., indicating if data is to be encrypted or encoded before it is stored in the segment); an availability setting (e.g., indicating if the segment is available for storing data from a remote computing device or the local computing device); an erasure coding setting (e.g., indicating if an erasure coding scheme is to be applied to data before the data is stored in the segment); or any combination of these. In some examples, the settings can be user customizable. The computing device 102 can store data in a segment of a persistent memory device according to one or more of the settings associated with the segment.

For example, the central processing unit 104 can determine (e.g., by accessing a database stored in memory, such as memory device 204a or memory device 204c) if an encryption setting associated with segment 208a is turned on or turned off. If the encryption setting is turned on, the computing device 102 can cause data to be encrypted before the data is stored in the segment 208a. If the encryption setting is turned off, the computing device 102 can cause data to be stored in the segment in the data's original (e.g., unencrypted) format.

As another example, the memory controller 108 can determine (e.g., by accessing database 206) if a segment of a remote persistent-memory device of a remote computing device has a particular setting or combination of settings. The memory controller 108 can cause data to be stored in the remote persistent-memory device in accordance with the setting(s). For example, the memory controller 108 can determine if an encryption setting for a particular segment of a remote persistent-memory device is turned on or turned off. If the compression setting is turned on, the memory controller 108 can cause data to be compressed before the data is stored in the segment of the remote, persistent memory device. If the compression setting is turned off, the memory controller 108 can cause data to be stored in the segment of the remote, persistent memory device in the data's original (e.g., uncompressed) format.

In some examples, the computing device 102 can include a network-interface component 210. An example of the network interface component 210 can include a network interface controller (NIC). The network interface component 210 can be for establishing or facilitating a network connection. In some examples, the network interface component 210 can include a wired interface (e.g., Ethernet, USB, IEEE 1394), a wireless interface (e.g., IEEE 802.11, Bluetooth, or a radio interface for accessing a cellular telephone network), or any combination of these. Although the network interface component 210 is depicted in FIG. 1 as being separate from the memory controller 108, in other examples the network interface component 210 can include the memory controller 108. In some examples, the network interface component 210 can perform one or more functions discussed with respect to the memory controller 108. For example, the network interface component 210 can perform an RDMA read operation, an RDMA write operation, or both of these.

The computing device 102 shown in FIG. 2 is for illustrative purposes. Other examples can include any number and combination of the components shown in FIG. 2, and the components can have any number and combination of the features discussed above.

Figure 3:
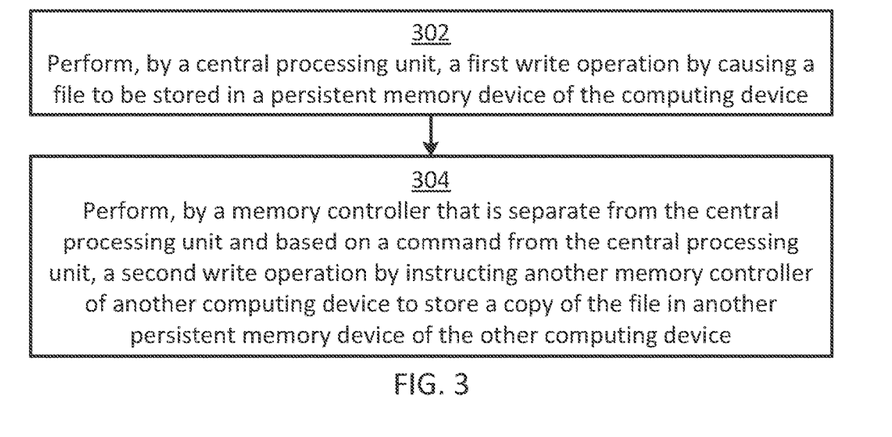
FIG. 3 is a flow chart showing an example of a process for managing persistent-memory devices according to some aspects.

The computing devices 102 can implement the process shown in FIG. 3 for managing persistent-memory devices. Some examples can include more, fewer, or different steps than the steps depicted in FIG. 3. The steps below are described with reference to components described above with regard to FIGS. 1-2.

Turning to FIG. 3, in block 302, the central processing unit 104a of the computing device 102a performs a first write operation. The first write operation can cause the file 110 to be stored in the persistent-memory device 106a of the computing device 102a. The file 110 can include a set of bytes.

In some examples, the first write operation can cause the file 110 to be directly stored in the persistent-memory device 106 of the computing device 102a. Directly storing the file 110 in the persistent-memory device 106a can include storing the file 110 in the persistent-memory device 106a without first storing the file 110 in another memory device, such as a buffer (e.g., a hardware buffer) or an intermediary memory device between the memory controller 108a and the persistent-memory device 106a.

In other examples, the first write operation can cause the file 110 to be indirectly stored in the persistent-memory device 106a of the computing device 102a. For example, the central processing unit 104a can store the file 110 in an intermediary memory device before ultimately storing the file 110 in the persistent-memory device 106a.

In block 304, the memory controller 108a of the computing device 102a performs a second write operation independently of (e.g., separately from) the central processing unit 104a. The memory controller 108a can perform the second write operation based on (or in response to) a command from the central processing unit 104a. The second write operation can include instructing another memory controller 108b of another computing device 102b to store a copy of the file 112a in another persistent-memory device 106b of the other computing device 102b.

For example, the second write operation can include transmitting an instruction (e.g., command) to the other memory controller 108b to cause the other memory controller 108b to directly store the copy of the file 112a in the persistent-memory device 106b. An example of the instruction can be an RDMA write instruction. The other memory controller 108b can receive the instruction and, in response to the instruction, directly store the copy of the file 112a in the persistent-memory device 106b. Directly storing the copy of the file 112a in the persistent-memory device 106b can include storing the copy of the file 112a in the persistent-memory device 106b without first storing the copy of the file 112a in another memory device, such as a buffer or an intermediary memory device.

In some examples, the second write operation can include instructing the other memory controller 108b of the other computing device 102b to indirectly store a copy of the file 112a in another persistent-memory device 106b of the other computing device 102b. This may cause the memory controller 108b to store the copy of the file 112a in an intermediary memory device before ultimately storing the copy of the file 112a in the persistent-memory device 106b.

In some examples, the central processing unit 104a can determine that the first write operation has been performed or is to be performed. Based on determining that the first write operation has been performed or is to be performed, the central processing unit 104a can automatically cause the memory controller 108a to perform the second write operation. For example, the central processing unit 104a can automatically transmit a command to the memory controller 108a to cause the memory controller 108a to perform the second write operation (e.g., substantially simultaneously to the first write operation being performed by the central processing unit 104a). In one example, any time the central processing unit 104a determines that the first write operation has been performed or is to be performed, the central processing unit 104a can cause the memory controller 108a to also automatically perform the second write operation. This can enable data to easily be mirrored or shared between the computing devices 102a-b, with minimal user involvement.

Figure 4:
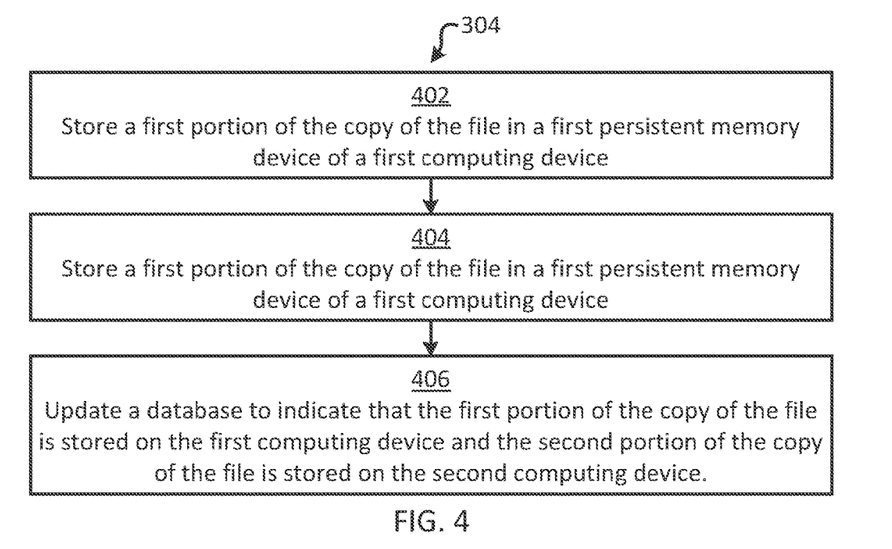
FIG. 4 is a flow chart showing an example of a process for performing a write operation according to some aspects.

In some examples, the memory controller 108a can perform the second write operation according to one or more of the steps shown in FIG. 4. And some examples can include more, fewer, or different steps than the steps depicted in FIG. 4.

In block 402, the memory controller 108a stores a first portion of the copy of the file 112a in a first persistent-memory device of a first computing device. For example, the memory controller 108a can split the copy of the file 112a into a first segment and a second segment, and cause the first segment to be stored on the persistent-memory device 106b of computing device 102b. The memory controller 108a can cause the first segment to be stored on the persistent-memory device 106b by transmitting an instruction to the memory controller 108b to cause the memory controller 108b to store the first segment in the persistent-memory device 106b.

In block 404, the memory controller 108a stores a second portion of the copy of the file 112a in a second persistent-memory device of a second computing device. For example, the memory controller 108a can cause the second segment to be stored on the persistent-memory device 106c by transmitting an instruction to the memory controller 108c to cause the memory controller 108c to store the second segment in the persistent-memory device 106c.

In some examples, the first portion of the copy of the file 112a and the second portion of the copy of the file 112a can collectively form the entire copy of the file 112a. In other examples, the copy of the file 112a can be divided into more than two segments, with each segment having the same size or different sizes. The copy of the file 112a can be split into any number and combination of segments that are stored on any number and combination of computing devices.

In block 406, the memory controller 108a updates a database, such as database 206, to indicate that the first portion of the copy of the file is stored on the first computing device and the second portion of the copy of the file is stored on the second computing device. For example, the memory controller 108a can include a new entry in the database or modify an existing entry in the to indicate that the first portion of the copy of the file 112a is stored on the computing device 102b and the second portion of the copy of the file 112b is stored on the computing device 102c.

In some examples, some or all of the computing devices 102a-c can maintain a database, such as database 206, indicating where some or all of the portions of the copies of files are stored. If a computing device 102a wants to recreate a file (e.g., because the file has been lost or damaged), the computing device 102a can access the database and obtain the respective portions of the copy of the file from the respective computing devices 102b-c. The computing device 102a can then combine the portions together to recreate the file. An example of such a process is described with respect to FIG. 5.

Figure 5:
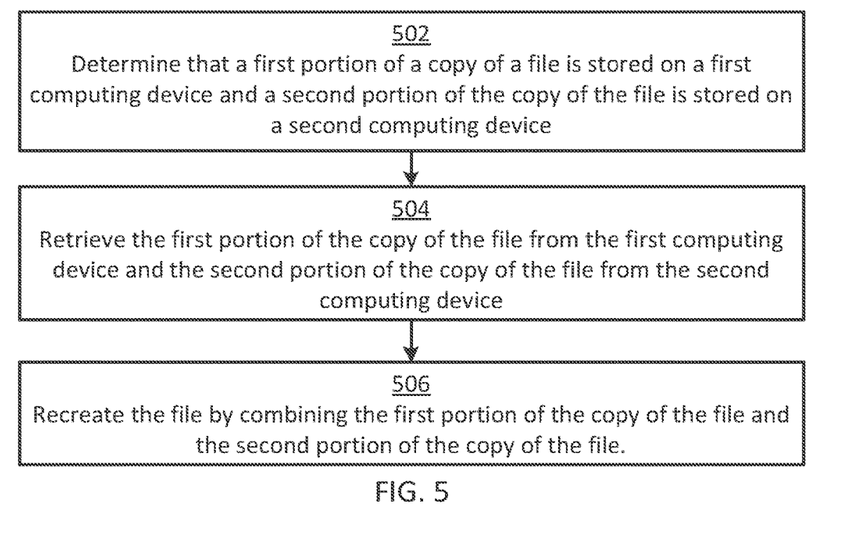
FIG. 5 is a flow chart showing an example of a process for recreating a file according to some aspects.

In block 502, the memory controller 108a determines that a first portion of the copy of the file 112a is stored on a first computing device 102b and a second portion of the copy of the file 112b is stored on a second computing device 102c. For example, the memory controller 108a can access a database 206 to map the first portion to the first computing device 102b and the second portion to the second computing device 102c.

In block 504, the memory controller 108a retrieves the first portion of the copy of the file 112a from the first computing device 102b and the second portion of the copy of the file 112b from the second computing device 102c. For example, the memory controller 108a can transmit a first command to the memory controller 108b to cause the memory controller 108b to obtain the data for the first portion of the copy of the file 112a and communicate (e.g., via the network 114) the data back to the memory controller 108a. The memory controller 108a can also transmit a second command to the memory controller 108c to cause the memory controller 108c to obtain the data for the second portion of the copy of the file 112b and communicate the data back to the memory controller 108a.

In block 506, the memory controller 108a recreates the file by combining the first portion of the copy of the file 112a and the second portion of the copy of the file 112b. For example, the memory controller 108a can prepend or append the first portion of the copy of the file 112a to the second portion of the copy of the file 112*b*. Alternatively, the memory controller 108*a* can communicate the first portion of the copy of the file 112*a* and the second portion of the copy of the file 112*b* to the central processing unit 104*a*, which can recreate the file by integrating together the first portion of the copy of the file 112*a* and the second portion of the copy of the file 112*b*.

In some examples, the memory controller 108*a* can perform some or all of the steps of FIG. 5 in response to an event. The event can include a user input, a software request, a request from another computing device 102*b-c*, a shutdown of the computing device 102*a*, a restart of the computing device 102*a*, a software failure (e.g., program failure, operating system failure, or firmware failure), a hardware failure, or any combination of these.

Although the description of FIGS. 3-5 is provided with reference to the memory controller 108*a* performing the steps, in other examples the central processing unit 104*a* or other hardware can additionally or alternatively perform some or all of the steps. For example, a memory-management application that is executing on the central processing unit 104*a* can perform the first write operation, the second write operation, or both of these. The memory-management application can be independent of an operating system executing on the central processing unit 104*a*. Alternatively, the memory-management application can run within the operating system as a background process or driver. This can enable the memory-management application to be substantially hidden from the user, or otherwise minimally interfere with the user's operation of the operating system.

Also, although the description of FIGS. 3-5 is described with reference to a file 110 for simplicity, other examples can be implemented using any type, combination, and amount of data (e.g., one or more bytes of data).

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

The invention claimed is:

1. A system comprising:
 a plurality of computing devices communicatively coupled to one another over a network, each computing device of the plurality of computing devices comprising:
  a memory device;
  a central processing unit that is communicatively coupled to the memory device, the central processing unit being configured to perform a first write operation for causing a file to be stored in the memory device; and
  a memory controller that is separate from and communicatively coupled to the central processing unit and the memory device, the memory controller being configured to perform, based on the first write operation, a second write operation without further involvement by the central processing unit, wherein the memory controller is configured to perform the second write operation by:
   causing a first memory controller of a first computing device of the plurality of computing devices to store a first portion of a copy of the file in a first memory device of the first computing device; and
   causing a second memory controller of a second computing device of the plurality of computing devices to store a second portion of the copy of the file in a second memory device of the second computing device.

2. The system of claim 1, wherein:
 the memory controller is included in a network interface controller that is configured to perform the second write operation according to a remote direct memory access (RDMA) protocol; and
 the first memory controller of the first computing device is configured to store the first portion of the copy of the file in the first memory device without first storing the first portion of the copy of the file in a buffer that is separate from the first memory device.

3. The system of claim 1, wherein the memory controller is further configured to:
 allocate a first segment of the memory device to storing data from another computing device of the plurality of computing devices; and
 allocate a second segment of the memory device for storing local data.

4. The system of claim 3, wherein the memory controller is further configured to:
 receive a request to store the data from the other computing device;
 determine that the first segment of the memory device is allocated to the other computing device; and
 based on determining that the first segment is allocated to the other computing device, store the data from the other computing device in the first segment.

5. The system of claim 1, wherein the memory controller is configured to perform the second write operation in a manner that is hidden from the central processing unit.

6. The system of claim 1, wherein the memory controller is configured to perform the second write operation by:
 updating a database to indicate that the first portion of the copy of the file is stored on the first computing device and the second portion of the copy of the file is stored on the second computing device.

7. The system of claim 6, wherein the memory controller is configured to, in response to an event:
 determine, using the database, that the first portion of the copy of the file is stored on the first computing device and the second portion of the copy of the file is stored on the second computing device;
 retrieve the first portion of the copy of the file from the first computing device and the second portion of the copy of the file from the second computing device; and
 recreate the file by combining the first portion of the copy of the file and the second portion of the copy of the file.

8. The system of claim 4, wherein the memory controller is configured to:
 determine a setting corresponding to the first segment of the memory device; and
 store the data from the other computing device in the first segment according to the setting.

9. The system of claim 8, wherein the setting is user configurable.

10. The system of claim 8, wherein the setting includes at least one of a compression setting, an availability setting, an erasure coding setting, or an encryption setting.

11. A method comprising:
 performing, by a central processing unit of a computing device, a first write operation by causing a file to be stored in a memory device of the computing device; and
 performing, by a memory controller that is separate from the central processing unit and based on to the first write operation, a second write operation without further involvement by the central processing unit, wherein the second write operation is performed by:
  causing a first memory controller of a first computing device of a plurality of computing devices to store a first portion of a copy of the file in a first persistent-memory device of the first computing device; and
  causing a second memory controller of a second computing device of the plurality of computing devices to store a second portion of the copy of the file in a second persistent-memory device of the second computing device.

12. The method of claim 11, wherein the memory controller:
  allocates a first segment of the memory device to storing data from another computing device; and
  allocates a second segment of the memory device for storing local data.

13. The method of claim 12, wherein the memory controller:
  receives a request to store the data from the other computing device;
  determines that the first segment of the memory device is allocated to the other computing device; and
  based on determining that the first segment is allocated to the other computing device, stores the data from the other computing device in the first segment.

14. The method of claim 11, wherein the memory controller performs the second write operation by:
  updating a database to indicate that the first portion of the copy of the file is stored on the first computing device and the second portion of the copy of the file is stored on the second computing device.

15. The method of claim 14, wherein the memory controller, in response to an event:
  determines, using the database, that the first portion of the copy of the file is stored on the first computing device and the second portion of the copy of the file is stored on the second computing device;
  retrieves the first portion of the copy of the file from the first computing device and the second portion of the copy of the file from the second computing device; and
  recreates the file by combining the first portion of the copy of the file and the second portion of the copy of the file.

16. A non-transitory computer readable medium comprising program code that is executable by a memory controller of a computing device for causing the memory controller to:
  detect that a central processing unit has issued a first write operation configured to cause a file to be stored in a memory device of the computing device; and
  perform, based on the first write operation, a second write operation without further involvement by the central processing unit, wherein the second write operation includes:
    causing a first memory controller of a first computing device of the plurality of computing devices to store a first portion of a copy of the file in a first memory device of the first computing device; and
    causing a second memory controller of a second computing device of the plurality of computing devices to store a second portion of the copy of the file in a second memory device of the second computing device.

17. The non-transitory computer readable medium of claim 16, wherein performing the second write operation includes causing the first memory controller of the first computing device to store the first portion of the copy of the file in the first memory device without first storing the first-portion of the copy of the file in a buffer that is separate from the first memory device; and
  further comprising program code that is executable by the memory controller for causing the memory controller to:
    allocate a first segment of the memory device to storing data from another computing device; and
    allocate a second segment of the memory device for storing local data.

18. The non-transitory computer readable medium of claim 17, further comprising program code that is executable by the memory controller for causing the memory controller to:
  receive a request to store the data from the other computing device;
  determine that the first segment of the memory device is allocated to the other computing device; and
  based on determining that the first segment is allocated to the other computing device, store the data from the other computing device in the first segment.

19. The non-transitory computer readable medium of claim 16, further comprising program code that is executable by the memory controller for causing the memory controller to perform the second write operation according to a remote direct memory access (RDMA) protocol and by:
  updating a database to indicate that the first portion of the copy of the file is stored on the first computing device and the second portion of the copy of the file is stored on the second computing device.

20. The non-transitory computer readable medium of claim 19, further comprising program code that is executable by the memory controller for causing the memory controller to, in response to an event:
  determine, using the database, that the first portion of the copy of the file is stored on the first computing device and the second portion of the copy of the file is stored on the second computing device;
  retrieve the first portion of the copy of the file from the first computing device and the second portion of the copy of the file from the second computing device; and
  recreate the file by combining the first portion of the copy of the file and the second portion of the copy of the file.

* * * * *